United States Patent
Fujii

(10) Patent No.: US 9,215,292 B2
(45) Date of Patent: Dec. 15, 2015

(54) INFORMATION PROCESSING APPARATUS, DATA DISTRIBUTION SYSTEM, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Kenichi Fujii, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 13/949,476

(22) Filed: Jul. 24, 2013

(65) Prior Publication Data

US 2014/0055627 A1    Feb. 27, 2014

(30) Foreign Application Priority Data

Aug. 22, 2012    (JP) ................................. 2012-183593

(51) Int. Cl.
*H04L 29/08*    (2006.01)

(52) U.S. Cl.
CPC .......... *H04L 67/32* (2013.01); *H04L 29/08144* (2013.01); *H04L 29/08072* (2013.01)

(58) Field of Classification Search
CPC .............. H04L 29/08144; H04L 29/06; H04L 29/08072; H04L 29/08171; H04L 12/5695
USPC ................................. 348/207.1, 159; 725/105
See application file for complete search history.

(56) References Cited

U.S. PATENT DOCUMENTS

| | | | |
|---|---|---|---|
| 6,473,098 B1 | 10/2002 | Wakai | |
| 6,587,861 B2 | 7/2003 | Wakai | |
| 6,633,871 B1 | 10/2003 | Jeyachandran | |
| 7,583,686 B2 | 9/2009 | Shitano | |
| 2007/0083654 A1* | 4/2007 | Yotsugi et al. | 709/226 |
| 2010/0194894 A1* | 8/2010 | Odaka et al. | 348/159 |
| 2012/0268605 A1* | 10/2012 | Sakamoto | 348/159 |

FOREIGN PATENT DOCUMENTS

| | | |
|---|---|---|
| JP | 2003-8977 | 1/2003 |
| JP | 2011-114699 | 6/2011 |

* cited by examiner

*Primary Examiner* — Twyler Haskins
*Assistant Examiner* — Fayez Bhuiyan
(74) *Attorney, Agent, or Firm* — Fitzpatrick, Cella, Harper & Scinto

(57) ABSTRACT

A detection unit detects connection status information of the plurality of information processing terminals and a generation condition for data in the information processing terminals. A derivation unit derives a predicted data amount predicted to be uploaded in a unit time to the information processing apparatus and a processable data amount that the information processing apparatus is capable of processing in a unit time based on at least one of the connection status information or the generation condition. A request unit makes a request to at least one information processing terminal, in a case where the predicted data amount exceeds the processable data amount, to change the generation condition for data in the at least one information processing terminal in order to lower a data amount.

20 Claims, 9 Drawing Sheets

| STREAM NAME | "ADD" ROLE CLIENT NUMBER | "ACQUIRE" ROLE CLIENT NUMBER | DATA ADDED TO STREAM FREQUENCY |
|---|---|---|---|
| STREAM A "SOCCER GAME" | 1000 | 10000 | LESS THAN 1 SECOND AVERAGE |
| STREAM B "FIELD DAY" | 100 | 200 | 1 MINUTE INTERVALS AVERAGE |
| STREAM C "PARTY" | 10 | 15 | 5 MINUTE INTERVALS AVERAGE |

F I G. 6

| STREAM NAME | CLIENT DEVICE | ADD IMAGE CONDITION |
|---|---|---|
| STREAM A | 150.61.1.8, 150.61.4.10, ... | IMAGE SIZE=L, IMAGE QUALITY=HIGH... IMAGE SIZE=S, IMAGE QUALITY=LOW... ... |
| STREAM B | 150.61.10.13, 150.61.10.2, ... | IMAGE SIZE=M, IMAGE QUALITY=MEDIUM... IMAGE SIZE=M, IMAGE QUALITY=HIGH... ... |
| STREAM C | 150.61.20.10, 150.61.1.4, ... | IMAGE SIZE=L, IMAGE QUALITY=HIGH... IMAGE SIZE=M, IMAGE QUALITY=LOW... ... |

F I G. 7

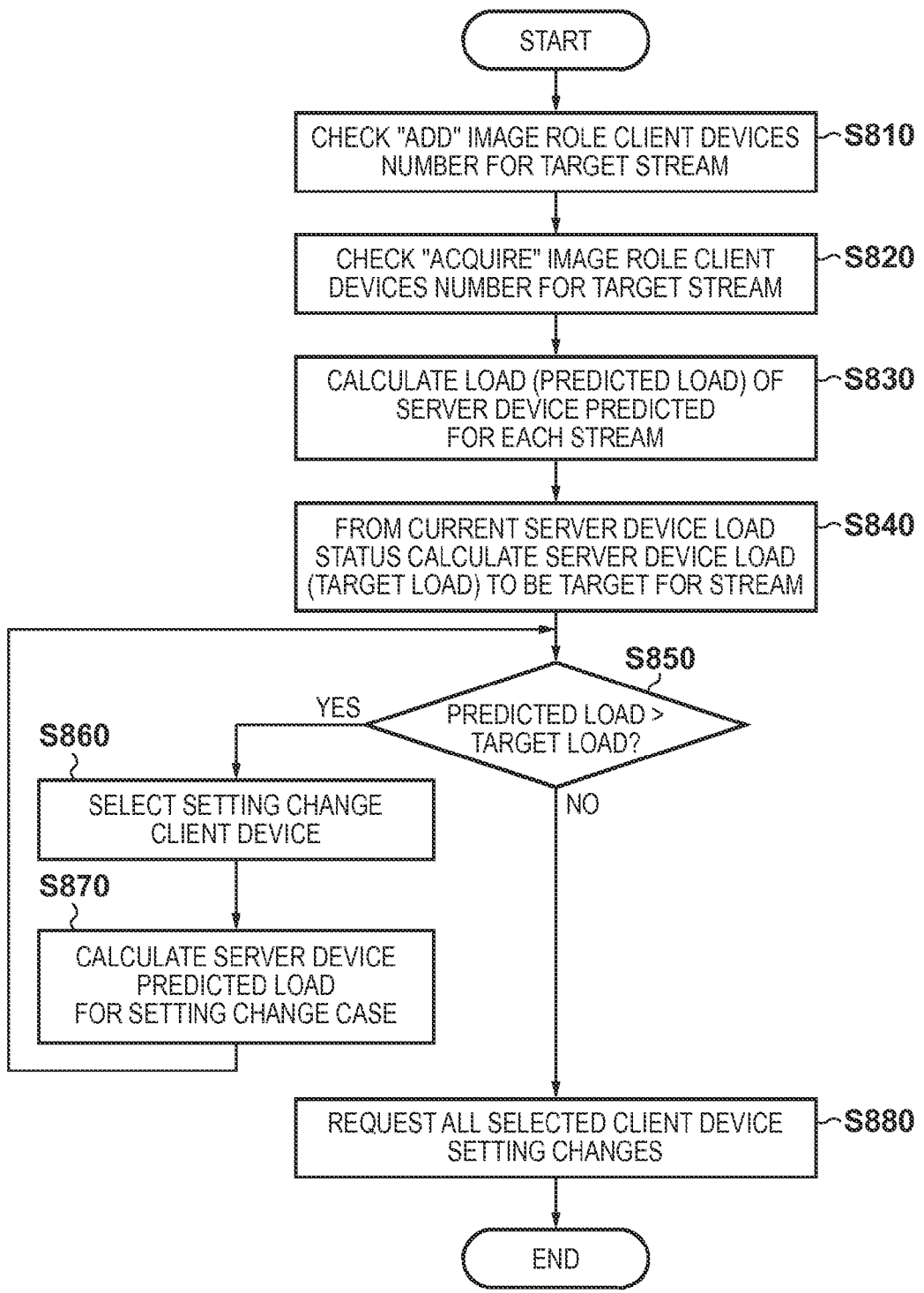

INFORMATION PROCESSING APPARATUS, DATA DISTRIBUTION SYSTEM, METHOD OF CONTROLLING INFORMATION PROCESSING APPARATUS, AND STORAGE MEDIUM

BACKGROUND OF THE INVENTION

1. Field of the Invention

The present invention relates to a data distribution system that makes data upload and download possible for a plurality of client devices connected to a server device via a network, and to a control method thereof.

2. Description of the Related Art

Due to progress in electronic computers, various software for making processing via a network possible has come to be installed on business equipment such as copy machines and the like, and on imaging devices for family use such as digital cameras, and the like. So, it is possible for these devices to connect to Internet services set up on the Internet as client devices. These client devices have functions for performing transmission and reception of data via the Internet with a server device. Also, the server device has functions for storing data transmitted from the client device, and also for transmitting data to a client device in accordance with a request.

In a case where an Internet service is provided to such a client device, it is necessary to use Internet technologies as typified by URL and HTTP as a base. URL is an abbreviation for Uniform Resource Locator, and is a describing method for indicating a location of data that exists on the Internet. A URL comprises an information access scheme, a server address, a port number, a path, and the like. HTTP is an abbreviation for Hypertext Transfer Protocol, and is a protocol used when a server device and a client device transmit and receive data specified by a URL. Various data exchange can be performed between a server device and a client device with HTTP.

Distributed processing techniques for causing a processing load to be distributed by using these Internet technologies and preparing a plurality of server devices in order to process access requests from numerous client devices on the server device side are known.

Thus, it can be thought that devices sold to general consumers in large numbers such as compact digital cameras, and the like, will increasingly be connected to Internet services as client devices. Accordingly, a higher level of load distribution capability will be required on the server device side.

Specifically, the case in which an image streaming social network service (hereinafter referred to as image SNS service) is provided for sharing photograph images in real time using a network supporting digital camera can be given as an example. In such a service, it is necessary to perform transmission and reception processing of images between a plurality of client devices and a server device in almost real time in order to share between users a plurality of images captured by a plurality of users as a sequential flow (stream). However, in a case where the number of client devices that successively transmit images increases, it is insufficient to only increase processing capability with distributed processing techniques on the server device side in order to maintain a constant image distribution time from the server device to another client device. This is because there is a limit to how many access requests from client devices, which can increase without bounds compared to the number of units, can be accommodated by only increasing efficiency on a relatively limited number of server devices.

Accordingly, a delay in image distribution time to another client device (user) participating in the service is forced to be accepted in this kind of image SNS service at a stage where processing capability expansion of the server device has reached a limit. In other words, in a service, such as an image SNS service, which must expect a large number of client devices connecting, it is problematic to attempt to maintain a responsiveness capability for the system on the whole by methods of performing efficiency improvement on the server device side alone. For this reason, there is a necessity to realize efficiency improvement on the client device side using some kind of method.

The following technique is presented in order to address the challenge of having not only a server device but also a client device handle a particular role in order for the system on the whole to efficiently process an increasing number of processing requests.

Firstly, in Japanese Patent Laid-Open No. 2011-114699, a technique in which terminal related settings are automatically changed in order that a terminal (client device) receive information distribution from other terminals (client devices) within the same hub in place of a server device in a case where the terminal entered an idle state is recited.

Also, in Japanese Patent Laid-Open No. 2003-008977, a technique in which camera (client device) settings are changed by transmitting capture advice information from a server device to a camera (client device) that can transmit a captured image to the server device is recited.

However, in the technique recited in Japanese Patent Laid-Open No. 2011-114699, a case in which a terminal (client device) that entered a sleep (rest) state is disconnected from the network is expected, and so an increase in active state terminals cannot be handled. Generally, in an image SNS service, because digital cameras maintaining an active state in order to capture a photograph are client devices, this technique cannot solve the problem in the aforementioned image SNS service.

Also, the technique recited in Japanese Patent Laid-Open No. 2003-008977 has an object of generating advice information on the server device based on an image that a camera uploaded, and changing target camera settings based on that information. In other words, the settings of the client device camera are changed based on information that the camera itself captured, and are not updated based on a load of the server device, or the like. Accordingly, in the technique recited in Japanese Patent Laid-Open No. 2003-008977, changing of client device settings in accordance with a load status on a server device side cannot be carried out.

SUMMARY OF THE INVENTION

Some embodiments of the present invention provides a data distribution system for improving processing efficiency for a system on the whole by adjusting processing on a client device side in accordance with a current load status of a server device, and a control method thereof.

According to one embodiment, an information processing apparatus which is connected to a plurality of information processing terminals via a network comprises: an acquisition unit configured to acquire data that is uploaded from at least one of the plurality of information processing terminals; a detection unit configured to detect connection status information of the plurality of information processing terminals and a generation condition for data in the information processing terminals; a derivation unit configured to derive a predicted data amount predicted to be uploaded in a unit time to the information processing apparatus and a processable data amount that the information processing apparatus is capable of processing in a unit time based on at least one of the connection status information or the generation condition; and a request unit configured to make a request to at least one information processing terminal, in a case where the predicted data amount exceeds the processable data amount, to change the generation condition for data in the at least one information processing terminal in order to lower a data amount.

According to another embodiment, a data distribution system has a plurality of information processing terminals and an information processing apparatus which is connected to the plurality of information processing terminals via a network, wherein the information processing apparatus comprises: an acquisition unit configured to acquire data that is uploaded from at least one of the plurality of information processing terminals; a detection unit configured to detect connection status information of the plurality of information processing terminals and a generation condition for data in the information processing terminals; a derivation unit configure to derive a predicted data amount predicted to be uploaded in a unit time to the information processing apparatus and a processable data amount that the information processing apparatus is capable of processing in a unit time based on at least one of the connection status information or the generation condition; and a request unit configured to make a request to at least one information processing terminal, in a case where the predicted data amount exceeds the processable data amount, to change the generation condition for data in the at least one information processing terminal in order to lower a data amount.

According to still another embodiment, a method of controlling an information processing apparatus which is connected to a plurality of information processing terminals via a network comprises acquiring data that is uploaded from at least one of the plurality of information processing terminals; detecting connection status information of the plurality of information processing terminals and a generation condition for data in the information processing terminals; deriving a predicted data amount predicted to be uploaded in a unit time to the information processing apparatus and a processable data amount that the information processing apparatus is capable of processing in a unit time based on at least one of the connection status information or the generation condition; and making a request to at least one information processing terminal, in a case where the predicted data amount exceeds the processable data amount, to change the generation condition for data in the at least one information processing terminal in order to lower a data amount.

According to yet another embodiment, a non-transitory computer-readable storage medium stores a program for causing a computer which is connected to a plurality of information processing terminals via a network to: acquire data that is uploaded from at least one of the plurality of information processing terminals; detect connection status information of the plurality of information processing terminals and a generation condition for data in the information processing terminals; derive a predicted data amount predicted to be uploaded in a unit time to the information processing apparatus and a processable data amount that the information processing apparatus is capable of processing in a unit time based on at least one of the connection status information or the generation condition; and make a request to at least one information processing terminal, in a case where the predicted data amount exceeds the processable data amount, to change the generation condition for data in the at least one information processing terminal in order to lower a data amount.

Further features of the present invention will become apparent from the following description of exemplary embodiments (with reference to the attached drawings).

BRIEF DESCRIPTION OF THE DRAWINGS

FIG. 6 is a view for showing a structure of data for stream management in the server device.

FIG. 7 is a view for showing a structure of data for client device management in the server device.

FIG. 8 is a flowchart for describing load adjustment processing in the server device.

DESCRIPTION OF THE EMBODIMENTS

As described above, in an image SNS service, in order to process processing requests, that have increased in number, efficiently for the system as a whole, it is desirable that some kind of a role is caused to be handled on the client device side as well, and not just by distributed control on a plurality of server devices. In a first embodiment of the present invention, processing efficiency can be improved for the system on the whole by adjusting a processing condition of the client device in accordance with a load status of the server device.

Hereinafter detailed explanation will be given based on embodiments of the present invention using the attached drawings. Note, the configuration shown in the following embodiment is only an example, and the present invention is not limited to the illustrated configuration.

The present invention relates to a data distribution system that realizes an image SNS service. Specifically, in this system, a plurality of client devices are connected via a network to the server device, and data uploaded from a first client device to the server device is downloaded to a second client device. One embodiment realizes following functions to improve for improving processing efficiency for the system on the whole by adjusting a data generation condition on the client device side in accordance with the current load status of the server device. Firstly, number-of-devices information and upload frequency information of first and second client devices that perform upload and download is acquired. Furthermore, an upload target data generation condition preset for each client device that performs upload is acquired. Next, according to the number-of-devices information, frequency information and generation condition, a predicted load that will occur due to data distribution by the server device is calculated. Furthermore, according to the load status due to processing other than data distribution by the server device, the number-of-devices information, the frequency information and the generation condition, a target load relating to data distribution by the server device is calculated. Next, in order that the predicted load satisfy the target load, the generation condition on the first client device is changed.

<First Embodiment>

Figure 1:
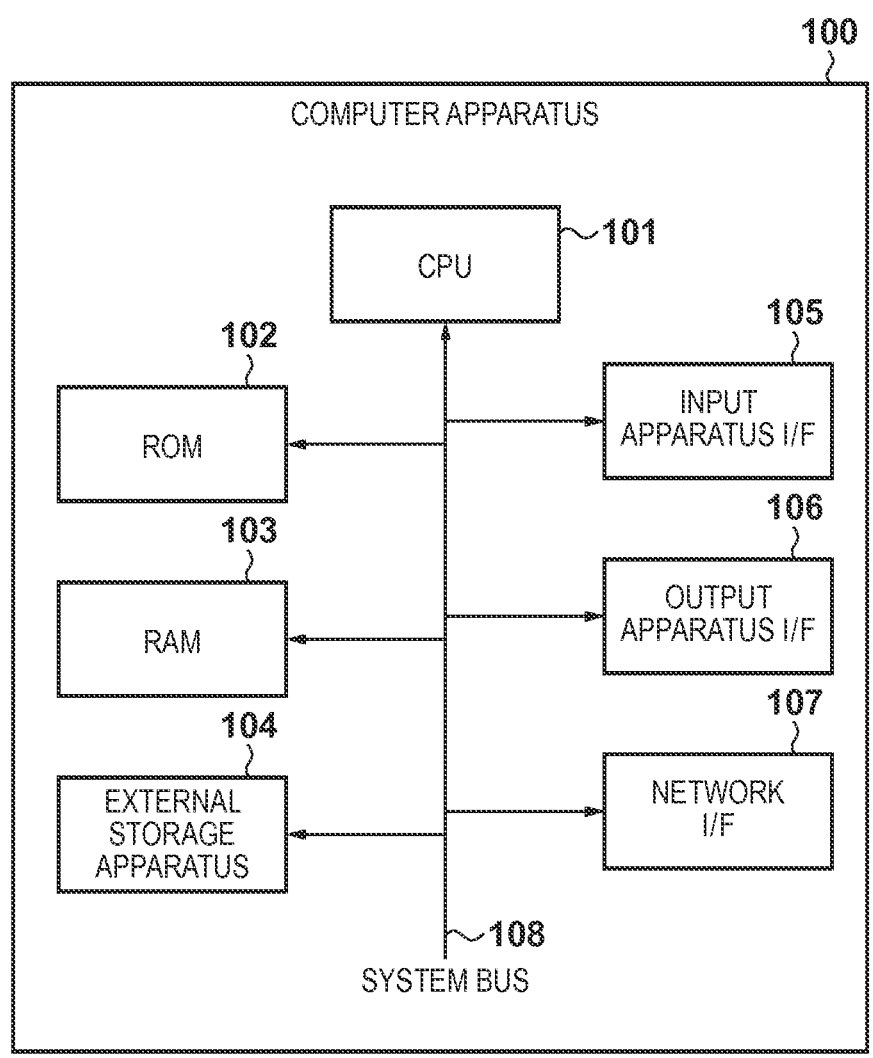
FIG. 1 is a block view for showing a hardware configuration of a client device and a server device in a data distribution system of one embodiment of the present invention.

FIG. 1 is a block view for showing a hardware configuration of a computer apparatus 100 used as a client device and as a server device in a data distribution system of one embodiment of the present invention. In the same figure, numeral 101 denotes a Central Processing Unit (CPU) for controlling the computer apparatus 100 on the whole. Numeral 102 denotes a Read Only Memory (ROM) for storing programs and parameters that do not need to be changed. Numeral 103 denotes a Random Access Memory (RAM) for temporarily storing programs and data provided from external apparatuses and the like. Numeral 104 denotes an external storage apparatus that may include a hard disk, a memory card or the like connected to the computer apparatus 100. Numeral 105 denotes an interface (I/F) with an input device (not shown) for receiving user operations and inputting data such as a pointing device or a keyboard. Numeral 106 denotes an I/F with an output apparatus (not shown) for displaying data that the computer apparatus 100 maintains and supplied data. Numeral 107 denotes a network I/F for connecting a network line (not shown) to the Internet or the like. Numeral 108 denotes a system bus connected so that each of the units 101 through 107 can communicate with each other.

Client Device Configuration

Figure 2:
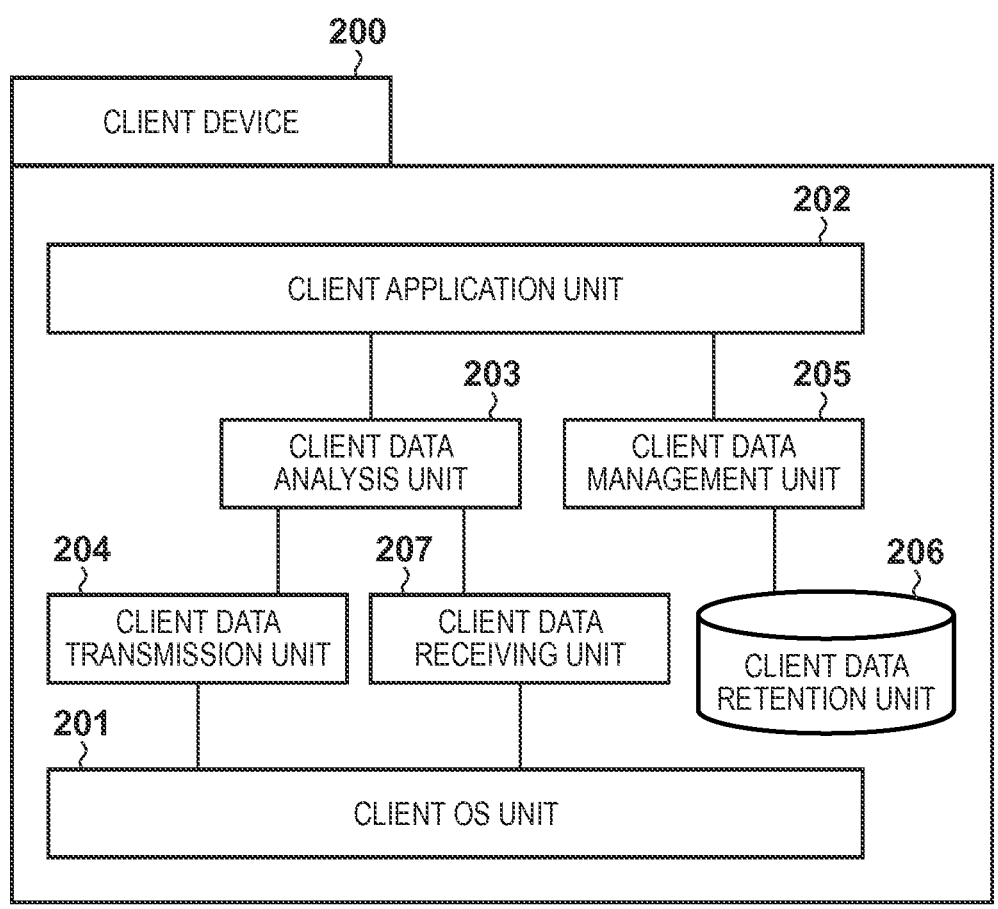
FIG. 2 is a block diagram for showing a main functional configuration of the client device of the present embodiment.

Explanation will be given for a function realized in a case in which the computer apparatus 100 shown in the above described FIG. 1 is used as a client device 200 of the present embodiment. FIG. 2 is a block diagram for showing a main functional configuration in a case where the computer apparatus 100 shown in FIG. 1 is used as the client device 200. For the client device 200, a digital camera which is an image capturing device capable of capturing still images and video is assumed. The client device 200 is identified by other devices by device identification unit having a function for identifying a particular device as is typified by an IP address. Hereinafter, detailed explanation will be given for each part that constitutes the client device 200.

A client OS unit 201 enables software to handle each type of hardware constituent element constituting the client device 200 abstractly as computer resources. Because the client OS unit 201 exists, other software components that operate on the client device 200 need not perform direct control of hardware. A client application unit 202 has functions that are unique to the type of the client device 200, and functions that are provided to a user. Here, because the client device 200 is a digital camera, functions such as image capture/save/edit/display, and control of settings related to image capture can be considered to be the functions unique to the type of device. The client application unit 202 is software for realizing these functions.

A client data analysis unit 203 analyzes data transmission requests from the client application unit 202, transfers them to a client data transmission unit 204, and also analyzes processing requested from a client data receiving unit 207 and transfers it to the client application unit 202. In a case where the client application unit 202 performs a data transmission request via a network to the server device, firstly the client data analysis unit 203 accepts the request. Next, the client data transmission unit 204 drives hardware that performs network processing via the client OS unit 201. Specifically, in the client data analysis unit 203, the client data transmission unit 204 converts a format of data that the client application unit 202 requests into a format that can be processed.

Here, explanation is given for processing in a case where the client device 200 uploads a captured image to the server device on the network. Firstly, the client application unit 202 makes a request to the client data analysis unit 203 to upload a processing target image as a file to be saved in a particular logical group (stream) that the server device on the network provides. When this is done, the client data analysis unit 203 analyzes this request, and generates transmission data including a host name and IP address corresponding to the actual server device, a transmission destination address end point URL and image information in a format conforming to HTTP. The client data analysis unit 203 adds data to/acquires data from the server device having a specific address in this way. Similarly, the client data analysis unit 203, having received a request from the client application unit 202, also realizes a function for transmitting setting information related to capture to the server device that the client application unit 202 manages.

The client data transmission unit 204 transfers the processing request from the client data analysis unit 203 to the client OS unit 201. For example, the client OS unit 201 is controlled based on the transmission destination and the transmission data that the client data analysis unit 203 converted. Specifically, the control of establishing a TCP/IP session and transmitting actual HTTP data is performed.

A client data management unit 205 manages data (target data) that the client application unit 202 handles using a client data retention unit 206. The client data retention unit 206 is, specifically, a non-volatile memory or a hard disk built into the device, and a storage region for actually retaining data is controlled by the client data management unit 205. Note, target data in the client device 200 (digital camera) is, specifically, captured image data.

The client data receiving unit 207 receives requests dispatched from the server device. A request from the server device on the network is received via the client OS unit 201, and reaches the client data receiving unit 207. The client data receiving unit 207, having received the data, transmits it to the client data analysis unit 203. Here, explanation will be given for processing in a case where there was an HTTP connection from the server device on TCP/IP port number 80 which the client OS unit 201 set up. In this case, analyzing an HTTP URL or header, or a payload, or the like, and transmitting to the client data analysis unit 203 are roles of the client data receiving unit 207. The client data analysis unit 203, having received the data, analyzes its content, organizes information that should be processed and transmits to the client application unit 202. For example, setting information related to capture requested by the server device is received via the client data receiving unit 207 and the request content is transmitted, having been converted to a format that the client application unit 202 can interpret.

The client device 200, by taking the above described software configuration, not only transmits requests and data to the server device on the network, but also has a function by which it can receive and process a request from the server device.

The client application unit 202 in the client device 200 also has a function for participating in an image SNS service that the server device provides. Here, the server device provides information for identifying logical unit streams for sharing image data via the network to the client application unit 202. The client application unit 202 of the client device 200 participates in the following two roles with respect to streams provided by the server device. First is the role of performing browsing without performing provision of images to the stream. In this case, the client device 200 is not necessarily a digital camera, and may be a normal portable terminal, a display apparatus, or the like. The other role is of performing not just browsing but also adding of an image to the stream in a case where the client device 200 is a device that has an image generation capability such as a digital camera. The client application unit 202 determines by what kind of role and what kind of stream to participate in.

Server Device Configuration

Figure 3:
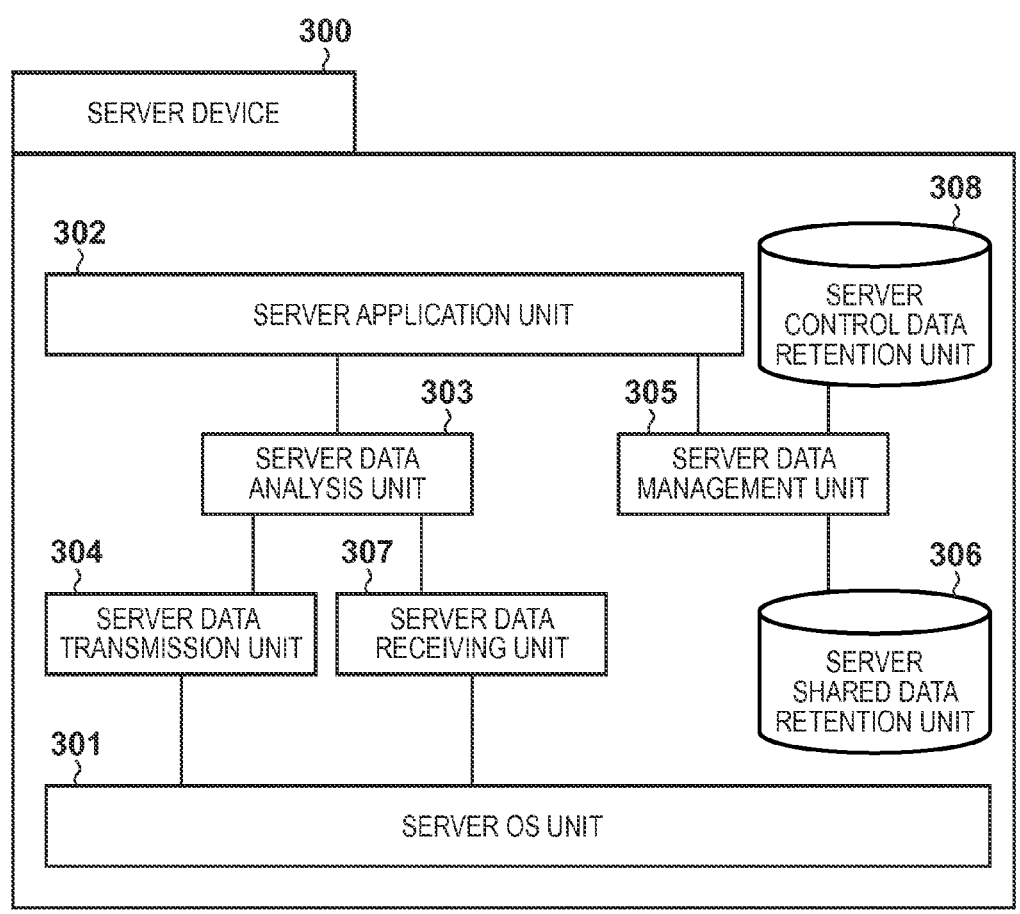
FIG. 3 is a block diagram for showing a main functional configuration of the server device on the present embodiment.

Explanation will be given below for a function realized in a case where the computer apparatus 100 shown in above described FIG. 1 is used as a server device 300. FIG. 3 is a block diagram for showing a main functional configuration in a case where the computer apparatus 100 shown in above described FIG. 1 is used as the server device 300. A device for providing an image stream type social networking service (image SNS service) that shares captured images in real time using a digital camera which is a client device 200 that supports a network is assumed for the server device 300. On the image SNS service, a plurality of photographs captured by a plurality of users can be shared between client devices (between users) as a sequential flow (stream). Accordingly, the server device 300 has a function for handling images almost in real time between the plurality of client devices. Note, the server device 300 is identified by other devices by device identification unit having a function for identifying a particular device as is typified by an IP address. Hereinafter, detailed explanation will be given for each part that constitutes the server device 300.

A server OS unit 301 enables software to handle each type of hardware constituent element constituting the server device 300 abstractly as computer resources and has functions that are basically similar to the client OS unit 201 of the client device 200. Because the server OS unit 301 exists, other software components that operate on the server device 300 need not perform direct control of hardware. The server OS unit 301 is able to determine a processing status of the CPU 101, the system bus 108, the network I/F 107 and the like within the apparatus (shown in FIG. 1) when it is necessary to perform control related to hardware of the server device 300. Specifically, the server OS unit 301 can report a status of the processing load in each part of hardware that constitutes the server device 300 which is the computer apparatus 100 in accordance with a request of other software comprised in the server device 300.

A server application unit 302 has functions that are unique to the image SNS service in the server device 300, and specifically is software for performing control of streaming management/receiving/saving/searching/transmitting images for streaming, and so on. Details of processing performed in the server application unit 302 will be explained later using FIG. 4, FIG. 5 and FIG. 8.

A server data analysis unit 303 receives a data analysis request from the server application unit 302 and makes a request for processing to a server data transmission unit 304. In a case where the server application unit 302 makes a data transmission request to the client device via the network, firstly the server data analysis unit 303 receives that request. After that, the server data transmission unit 304 drives hardware for performing network processing via the server OS unit 301. In other words, the server data analysis unit 303 performs processing for converting a format of data that the server application unit 302 requests into a format that the server data transmission unit 304 can process.

Here, explanation will be given for an operation of the server application unit 302 in the server device 300 that provides the image SNS service. In a case where the server application unit 302 determines that it is necessary to change setting information related to capturing for a specific client device, the following processing is performed. The server application unit 302 transmits information related to a device identification unit for identifying the specific client device and setting change contents to the server data analysis unit 303. When this is done, the server data analysis unit 303 analyzes this request and generates a transmission destination address which is an actual host name and IP access corresponding to the client device and transmission data in a format that the client device can receive. Next, the server data transmission unit 304 transmits the processing request from the server data analysis unit 303 to the server OS unit 301. For example, the server data analysis unit 303 controls the server OS unit 301 based on the transmission destination address and transmission data that it converted. Specifically, control of establishing a TCP/IP session and transmitting the actual data is performed.

A server data management unit 305 manages main data retained by the server device 300. A server control data retention unit 308 retains data related to load distribution control of the server device 300 and the client devices. Details of data retained by the server control data retention unit 308 will be explained later using FIG. 6 and FIG. 7. A server shared data retention unit 306 retains logical unit streams for sharing images via the server device 300 amongst client devices and data shared between client devices. The server control data retention unit 308 and the server shared data retention unit 306 perform saving of data using non-volatile memory or a hard disk connected to the server device 300.

A server data receiving unit 307 receives requests dispatched from the client device. A request from the client device on the network is received via the server OS unit 301 and reaches the server data receiving unit 307. The server data receiving unit 307, having received the data, converts it into a format that the server data analysis unit 303 can process. Here, explanation will be give for processing in the case where there was an HTTP connection from an external device to the server OS unit 301 on the TCP/IP port number 80. In this case, analyzing an HTTP URL and header or a payload or the like, and transferring to the server data analysis unit 303 are roles of the server data receiving unit 307.

The server device 300 can provide multiple streams to the client device, each stream being a unit to which logical data flows are grouped. Information needed to configure such a stream (stream information) is stored in the server control data retention unit 308 and managed by the server data management unit 305. Stream information may be such things as, for example, a list of client devices that are currently participating in the stream or a list of images that are saved in the stream.

The server device 300, by taking the above described configuration, not only receives requests from a client device on the network but also has a function by which it can cause processing to be performed by transmitting a request to the client device.

The server application unit 302 provides multiple streams to the client device by controlling the server data analysis unit 303 according to information retained in the server control data retention unit 308 that the server data management unit 305 manages. Unique identifier information is attached to each stream and stored in the server control data retention unit 308. The client device can identify a stream that it is participating in by this identification information. Also, the server device determines whether the client device performs image data adding (upload) or only performs acquisition (download), and records the result of this determination along with device identification information for identifying the client device into the server control data retention unit 308.

Also, the server application unit 302 determines whether image generation condition (conditions for generating images to be added or added-image conditions) settings should be changed in each client device from a status of the current processing load acquired from the server OS unit 301 and data stored in the server control data retention unit 308. Also the server application unit 302 can make a request that the added-image conditions be changed to each client via the server data analysis unit 303 and the server data transmission unit 304.

Processing Sequence

Below explanation will be given for a main processing sequence in the client device and the server device in the present embodiment.

Figure 4:
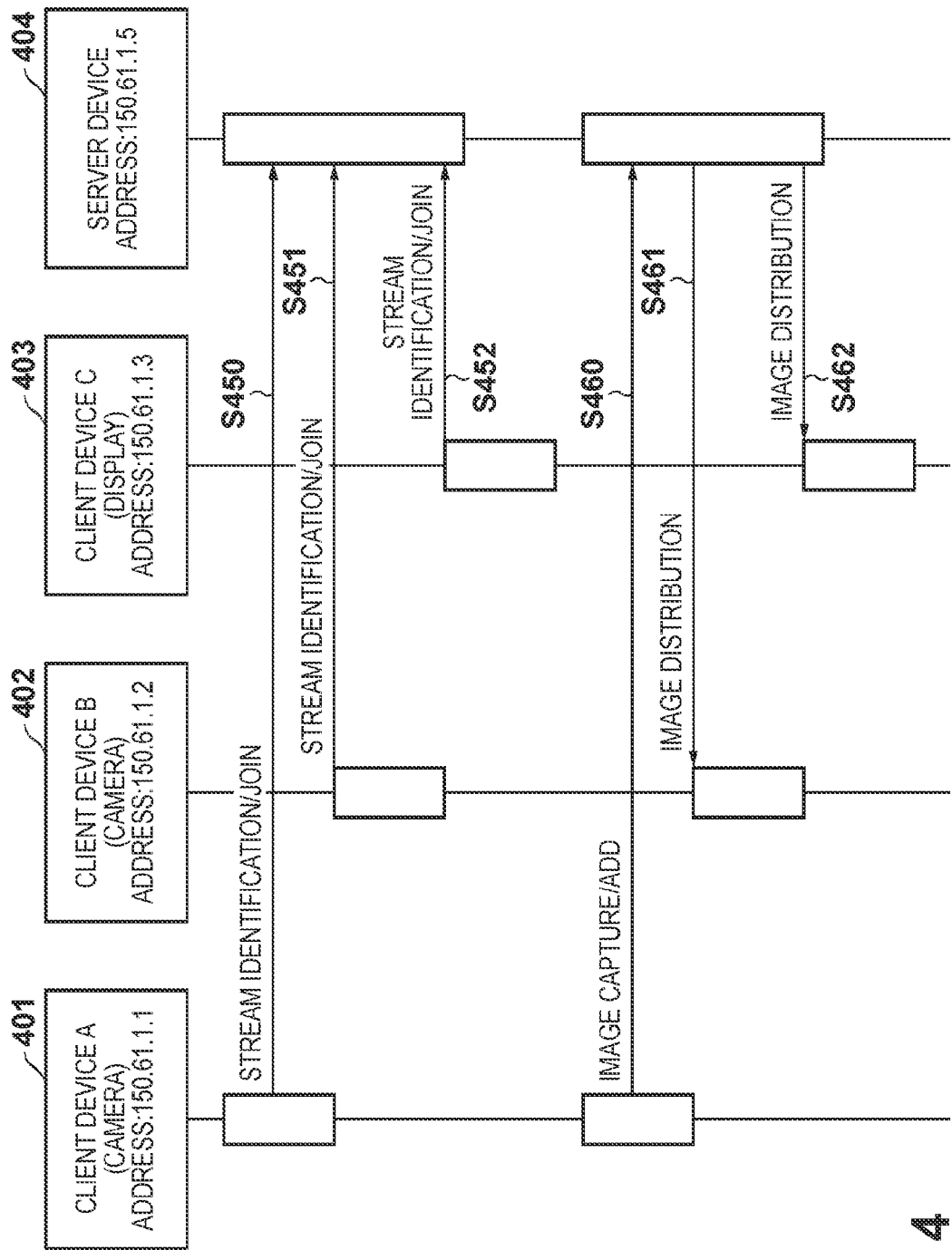
FIG. 4 is a view for showing a processing sequence between client devices in a case where the server device does not perform a load adjustment.

Firstly, a processing sequence for a case where the server device does not perform load adjustment is shown in FIG. 4. In FIG. 4, numerals 401, 402 and 403 denote client devices A, B and C, and the configuration of each of these is shown as the client device 200 in FIG. 2. The client device A 401 and the client device B 402 are cameras having an imaging capability, and the client device C 403 is a display that does not have an imaging capability. Numeral 404 denotes the server device having a function for providing an image SNS service and whose configuration is shown as the server device 300 in FIG. 3. The client devices A 401, B 402 and C 403 and the server device 404 are identified by the IP addresses shown respectively in FIG. 4.

In FIG. 4, firstly, in step S450, the client device A 401 identifies a stream that the image SNS service of the server device 404 provides, and joins it. Similarly, the client device B 402, in step S451, and the client device C 403, in step S452, join the stream that the image SNS service of the server device 404 provides. Here, it is assumed that the three client devices A 401 through C 403 all joined a stream having the same identifier out of the plurality of streams that the server device 404 provides.

The client device A 401, in step S460, makes a request to the server device 404 for adding of a captured image to the stream that it joined. The server device 404, having received the request, performs distribution of the image in step S461 to the client device B 402 participating in the same stream. Similarly, the server device 404, in step S462, performs distribution of the image to the client device C 403 participating in the same stream as the client device A 401. In this way, the client devices B 402 and C 403 can share (can also use) the image that the client device A 401 captured via the stream that the server device 404 provides.

Figure 5:
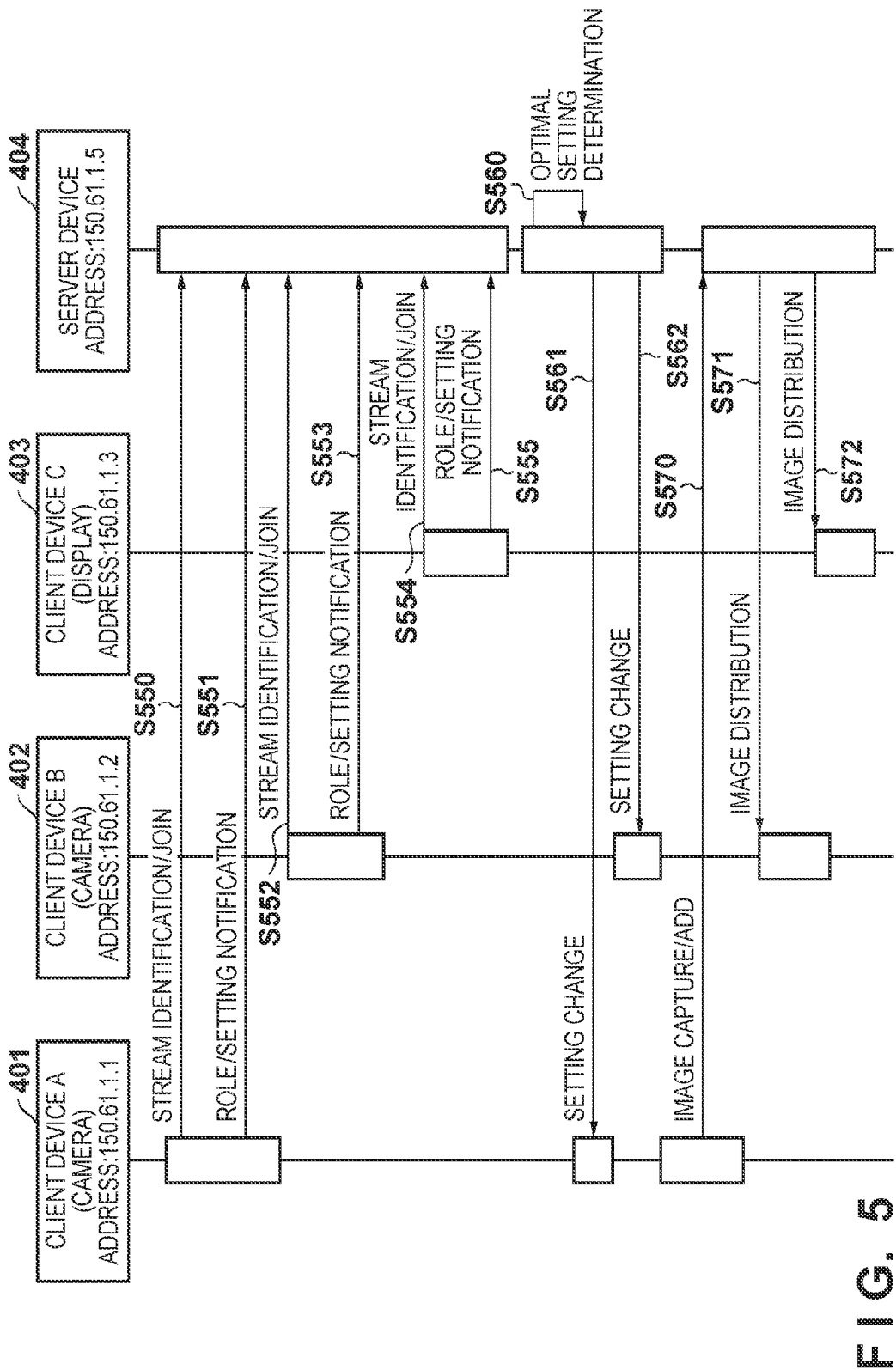
FIG. 5 is a view for showing an example of a processing sequence between client devices in a case where the server device does perform a load adjustment.

Next, a processing sequence for a case where the server device performs load adjustment characteristic of the present embodiment is shown in FIG. 5. In FIG. 5, each of the client devices and the server device are the same as those shown in FIG. 4. Specifically, the client devices A 401 and B 402 are cameras having an imaging capability, the client device C 403 is a display that does not have an imaging capability, and the server device 404 has a function for providing an image SNS service. Also, the client devices A 401 through C 403 and the server device 404 are identified by IP addresses as shown respectively in FIG. 5.

In FIG. 5, firstly in step S550, as in step S450 of FIG. 4, the client device A 401 identifies a stream that the image SNS service of the server device 404 provides and joins it. Next, in step S551, the client device A 401 communicates setting details for added-image conditions and a participant role for the stream to the server device 404. Here, it is assumed that the client device A 401 communicates to the server device 404 that the participant role is "client device that "adds" images" and the added-image conditions is "image size=L, image quality=high".

Next, in step S552, as in step S451 in the above described FIG. 4, the client device B 402 joins a stream that the image SNS service of the server device 404 provides. Next, in step S553, the client device B 402 communicates setting details for added-image conditions and a participant role for the stream to the server device 404. Here, it is assumed that the client device B 402 notifies the server device 404 that the participant role is "client device that "adds" images" and the added-image conditions are "image size=M, image quality=low".

Next, in step S554, in the same was as in step S452 of FIG. 4, the client device C 403 joins a stream that the image SNS service of the server device 404 provides. Next, in step S555, the client device C 403 communicates setting details for added-image conditions and a participant role for the stream to the server device 404. Here, it is assumed that the client device C 403 notifies the server device 404 that the participant role is "client device that "acquires" images" and the added-image conditions are "none".

The server device 404, having received data from each client device, determines added-image conditions for each client device, in step S560; the details of this will be explained later using FIG. 8.

After this, the server device 404 applies the added-image conditions determined in step S560 to the client device A 401 in step S561, and the client device B 402 in step S562 respectively.

Next, in step S570, the client device A 401, in the same way as in step S460 in the above described FIG. 4, makes a request to the server device 404 to add a captured image to the joined stream. The server device 404, having received the request, performs distribution of the image, in step S571, to the client device B 402 participating in the same stream. Similarly, the server device 404, in step S572, performs distribution of the image to the client device C 403 as well. In this way, the client devices B 402 and C 403 can share (can also use) the image that the client device A 401 captured via the stream that the server device 404 provides.

Data Structure

Here, FIG. 6 shows an example of a structure of data for stream management managed by the server control data retention unit 308 in the server device 300 of the present embodiment. As shown in the same figure, the server control data retention unit 308 retains information for an actual frequency of updating data including adding data and a number of client devices currently participating for a plurality of streams that the server device 300 manages. According to the data example for stream A shown in the same figure, the number of client devices participating in a role in which they "add" images to stream A is 1000 at this point. Also, the number of client devices participating in a role in which they "acquire" images from stream A, is 10000 at this point. Note, clients that "add" images are often clients that "acquire", simultaneously. Also, the adding of data from a client device to stream A is performed one or more times in less than a second on average. Similarly, the number of participating client devices, and the data addition occurrence frequency for stream B and stream C are shown. The frequency of updating data including adding data for each client device may be acquired from a communication history. This data for stream management is managed by the server control data retention unit 308, and updated by the server application unit 302 to continuously be up to date.

Also, in FIG. 7, an example of a structure of data for client device management which is managed by the server control data retention unit 308 in the server device 300. As shown in the same figure, the server control data retention unit 308 retains added-image conditions setting status of each client device and information for identifying currently participating client devices for the plurality of streams that the server device 300 manages.

In the present embodiment, the client device 200 can set image size and image quality as conditions (added-image conditions) when image generation is performed. Set values of the image size may be, for example, the set values of "L (large)", "M (medium)" or "S (small)". Also, set values of the image quality may be, for example, "High (high quality)" or "Low (low quality)". The amount of image data actually transferred between the client device 200 and the server device 300 of the present embodiment is determined according to parameters for both the image quality and image size set for the image. Specifically, the amount of data is largest in the case of "image size=L, image quality=High" and lowest in the case of "image size=S, image quality=Low". The server control data retention unit 308 retains these image size and image quality parameters as added-image conditions setting content in the client devices currently participating in the plurality of streams. The added-image conditions for each client device may be acquired from a communication history.

Also, IP addresses are retained as information for identifying client devices currently participating in the plurality of streams. However, the client devices that are managed here is limited to the client devices participating in the "add" image role. In the example of FIG. 7, a client device identified by IP address 150.61.1.8 is participating in stream A, and the added-image conditions set for capturing on this client device are "image size=L, image quality=High". A client device identified by IP address 150.61.4.10 is also participating in stream A and the added-image conditions set for capturing on this client device area "image size=S, image quality=Low". Similarly for stream B and stream C a list of IP addresses for identifying client devices participating with the "add" image role and added-image conditions of each client device are retained. Data for client device management is managed by the server control data retention unit 308 and is continuously kept up to date by the server application unit 302.

Server Processing

Detailed explanation will be given below for the load adjustment processing shown executed for a stream that is the target of adjustment (hereinafter referred to as the target stream) (specifically, load adjustment processing shown in the above described FIG. 5) using the flowchart of FIG. 8 in the server device 300 of the present embodiment. FIG. 8 shows the details of step S560 through step S562 in the server device 404 shown in the above described FIG. 5, and these are executed by the server application unit 302. In the server application unit 302, load adjustment is performed using data saved by the server data management unit 305 and the server control data retention unit 308 shown in the above described FIG. 6 and FIG. 7.

Firstly, in step S810, for the target stream, the number of client devices having the "add" image role is checked. This is performed by using the data for stream management shown in FIG. 6. Similarly, in step S820, the number of client devices having the "acquire" image role for the target stream is checked. This is performed by using the data for client device management shown in FIG. 7.

Next, in step S830, a maximum load (predicted load) of the server device predicted for the target stream is calculated as follows from a frequency at which images are added by client devices and by the numbers of client devices for each role and added-image conditions. Firstly, the frequency at which images are added is confirmed from the data for stream management shown in FIG. 6. Also, the number of client devices (percentage) having the image adding or acquiring roles is acquired from the data for stream management shown in FIG. 6 in the above described step S810 and step S820. Accordingly, in step S830, using this information, a maximum load (predicted load) of the server device predicted for the target stream can be calculated. Specifically, an image data amount added within a predetermined time calculated from the data for the target stream may be made to be the predicted load.

Next, in step S840, based on a load status for processing other than that of the target stream at the current point in time on the server device 300, a server load to be accepted for the target stream (target load) is calculated as follows. Firstly, for the processing load status of the server device at the current point in time, acquisition is possible by querying of the server OS unit 301. Also, information for the frequency at which images are added can be acquired from the data for stream management shown in FIG. 6. Also, the total numbers and roles of client devices that could possibly connect to the target stream are acquired from the data for stream management shown in FIG. 6 in the above described step S810 and step S820. Also, the current added-image conditions of each of the client devices are acquired from the data for client device management shown in FIG. 7. Accordingly, in step S840, an accepted load (target load) of the server device that should be made the target for the target stream can be calculated using this information. Specifically, an image data amount that can be added within a predetermined amount of time under the current load status of the server device for the target stream is calculated based on the data and this may be made to be the target load.

Next, in step S850, the predicted load calculated in step S830 and the target load calculated in step S840 are compared. If the result of this comparison is that the predicted load exceeds the target load, in step S860, a client device to be the added-image conditions change target is selected.

In step S860, for example, a single client device which, as a result of a predetermined change being applied to the added-image conditions, would most reduce the load of the server device for the target stream is selected. The selection is performed using the data for client device management shown in FIG. 7. Note, a change by which the data amount of images added to the stream is reduced (image quality reduction) may be performed as the added-image conditions change. For example, in addition to change in image size or format (RAW to JPEG, etc.), resolution reduction, and increased compression, forced switching from optical zoom to digital zoom, and the like may also be considered. For example, when a change in image size is performed as the change in added-image conditions, the client device with IP address 150.61.1.8 is selected as the change target for reducing load on stream A in the example shown in FIG. 7. This is because the image size of this client device is set to be higher than the other client device with IP address 150.61.4.10 for stream A. In other words, it is determined that there is a high likelihood that the amount of image data created and load reduced will be more in the case where the client device with the IP address 150.61.1.8 has, for example, the image size lowered one level.

Next, in step S870, a load of the server device predicted for the target stream (predicted load) in the case where the predetermined change is applied to the added-image conditions for the change target client device selected in S860 is calculated. This calculation of predicted load is performed by the same method as is described above in step S830.

After the predicted load is calculated in step S870 for after the added-image conditions change of the client device, the predicted load is once again compared with the target load in step S850. In other words, in the present embodiment, comparison with the target load is performed, having as an initial value, the predicted load calculated in step S830, and updating the predicted load in step S870.

In a case where the result of the comparison in step S850 is that the predicted load still exceeds the target load, by performing additional client device selection in step S860, the number of client devices targeted for added-image conditions changing is caused to increase. Specifically, in step S860, an additional client device, other than the client devices already selected as change targets, that would most reduce the load of the server device by having its added-image conditions changed is selected. Then, in step S870, the predicted load is once again calculated after the change, and the above processing is repeated until the predicted load is less than or equal to the target load in step S850.

In a case where the predicted load is less than or equal to the target load in step S850, the processing proceeds to step S880, and the added-image conditions changes are applied to all of the client devices that were selected to be change targets in step S860.

Note, the processing in step S810 through S870 shown in FIG. 8 corresponds to the added-image conditions determination processing on each client device in step S560 of FIG. 5. Similarly, the added-image conditions change processing in step S880 corresponds to the after-change added-image conditions application processing after the change to the client device shown in step S561 and step S562 of FIG. 5.

Note, an example was shown in which, in steps S850 through S870 of the present embodiment, the number of change target client devices is increased until the predicted load reaches the target load, but a case can be conceived in which the number of change target clients reaches an upper limit. In this case, appropriate error processing may be performed, but it is also effective to further change added-image conditions.

As explained above, by the present embodiment, in a case where it is predicted that the data transmission requests from the client devices will exceed the current processing capability of the server device, the amount of data added to the stream by the client devices is controlled. With this, it is possible to balance processing load of the server device and time taken for data distribution.

<Second Embodiment>

Below explanation will be given for a second embodiment of the present invention. Because the configurations of the server device and the client device in the second embodiment are similar to those of the first embodiment, explanation of these is omitted. In the second embodiment, similar load adjustment is performed to that of the first embodiment, but the predicted load calculation processing of the server device performed in step S830 and step S870 in FIG. 8 is different to the first embodiment. In step S830 in the first embodiment, an example was shown in which a load of the server device (predicted load) predicted for each stream is calculated from the frequency at which images are added by the client devices, the number of client devices of each role and the added-image conditions. According to the second embodiment, calculation of a predicted load of the server device for each stream is made using only either number-of-devices information for client devices participating in the stream or frequency information for image adding. Hereinafter calculation of the predicted load will be referred to simply as "load prediction".

Firstly, in a case where load prediction is performed without using frequency information for image adding, whether or not image data is already added to the stream becomes irrelevant. This kind of load adjustment by load prediction is useful as a preventative measure against load increase in a case where the number of client devices indicating participation is extremely large. For example, in case where load prediction is performed for a stream corresponding to a special event whose start time is determined in advance, it is useful for guaranteeing a particular responsiveness capability. Note, in this case, information for data update frequency in data for stream management shown in FIG. 6 is unnecessary.

Here, in the above described special event, in a case where image adding frequency is used for load prediction as in the first embodiment, load prediction based on added-image conditions of client devices cannot be performed until after the special event has started. So, by not using frequency information of image adding as with the second embodiment, it becomes possible to take preventative measures before the event by load prediction based on the number of participating clients alone.

Also, load prediction using only frequency of image adding for a special event in which the participation status of client devices changes frequently is effective. For example, considering a stream for a long period such as a few days of a few weeks, it is expected that the client device digital cameras will frequently be in a powered off state. In such cases, because when load prediction is performed based on a number of participating clients the number of participating clients rises and falls frequently due to powering off, an accurate prediction cannot be made. In this case, by not using the number of clients and only performing load prediction based on frequency information of image adding, it is possible to achieve a more appropriate prediction result. Note, in this case, number-of-devices information of client devices with the "add" role becomes unnecessary in the data for stream management shown in FIG. 6.

As explained above, with the second embodiment, adaptive load adjustment is possible by performing load prediction of the server device based only on either frequency information for image data adding of client devices or number-of-devices information for client devices.

<Third Embodiment>

Below, a third embodiment according to the present invention will be explained. In the third embodiment the configurations of the server device and the client device are similar to those in the first embodiment and so their explanation is omitted. As in the first embodiment, load adjustment is performed in the third embodiment as well. The processing related to changing the added-image conditions of the client device performed in step S870 and step S880 in FIG. 8 and the added-image conditions of each client device shown in the data for client device management in FIG. 7 is different to that of the first embodiment.

In the first embodiment, an example is shown in which information for image size and image quality is retained as content of an "added-image conditions" field of the data for client device management shown in FIG. 7. According to the third embodiment, as the content of this "added-image conditions" field "time interval" information for a time interval in which each client device can add images to the stream is further added. In other words, in the third embodiment, in a case where the client added an image to a particular stream, it cannot add another image until the time defined in the "time interval" passes. On the server device, "time interval" information in the data for client device management is made to be the target of added-image conditions change in step S870 and step S880 in FIG. 8. Note, upon load prediction in step S830, image adding frequency information in the data for stream management in FIG. 6 is referenced and the above described "time interval" setting is not referenced. In accordance with changes in the "time interval" setting by the server device in step S870 and step S880, the data adding frequency information in the data for stream management in FIG. 6 is changed.

As explained above, with the third embodiment, more adaptive load adjustment is possible by adding image adding "time interval" information to the added-image conditions in the client device.

<Fourth Embodiment>

Below, a fourth embodiment according to the present invention will be explained. In the fourth embodiment the configurations of the server device and the client device are similar to those in the first embodiment and so their explanation is omitted. According to the fourth embodiment, along with the added-image conditions change processing of the client device executed in step S561 and step S562 of FIG. 5 when load adjustment is performed in the first embodiment, the change content is reported to the user.

Figure 9:
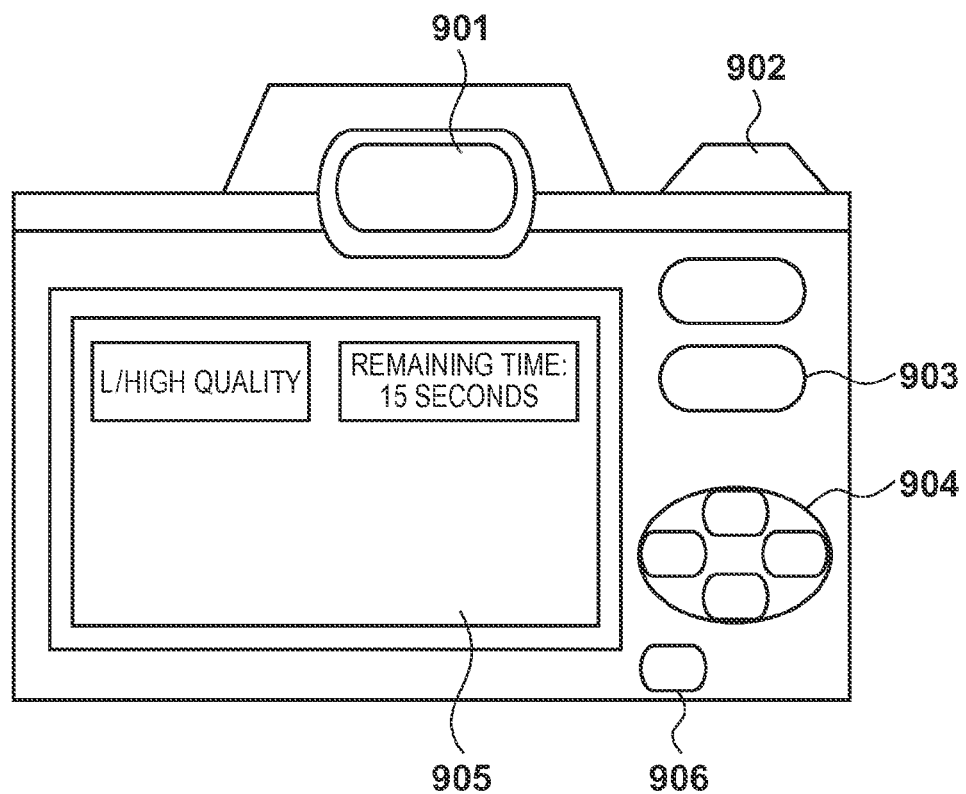
FIG. 9 is a view for showing an example of an operation/display panel in a case where the client device is a digital camera in a fourth embodiment.

In the fourth embodiment, it is assumed that it is the case that the client device 200 in the above described first embodiment is a digital camera. FIG. 9 is a view for showing schematically an operation and display panel arranged on a back side of a client device digital camera (hereinafter, simply referred to as camera) in the fourth embodiment. In the same figure, numeral 901 denotes a viewfinder which displays visually to the user an image that the camera is to capture. Numeral 902 denotes a shutter button, and when this is pressed by the user, capturing of a still image or a video is performed. Numeral 903 denotes a status lamp which indicates information on the camera that changes such as an energization state and a status for the amount of memory remaining. Numeral 904 denotes an operation button which is used when a user selects/determines a menu shown on a display panel 905. Numeral 905 denotes the display panel upon which display of a captured image or of the current added-image conditions or display of menus by which various functions are invoked is performed. Numeral 906 denotes a speaker that can output audio.

In the fourth embodiment, on a camera to which a change in added-image conditions was requested by the server device in step S561 of FIG. 5, for example, it is reported to the user using the above described display panel 905 or the like. In the fourth embodiment, the method of reporting may be any of the following independently or may be executed as a combination of the following.

Firstly, the added-image conditions are shown on the display panel 905 for the current time as shown in FIG. 9. In the example of FIG. 9, "L/high quality" is displayed as the added-image conditions for the current time in the upper left of the display panel 905. Display may further be carried out so that it can be known whether or not these added-image conditions where changed by the server device.

Also, in as case where a setting was made so that another image cannot be captured until a predetermined amount of time elapses such as in the above described third embodiment, an amount of time remaining until capture can be performed once again may be displayed successively as exemplified in "remaining time: 15 seconds" in the top right of the display panel 905.

Also, reporting that the added-image conditions of the camera changed may be performed using blinking or lighting of the status lamp 903 or by audio output from the speaker 906 instead of displaying to the display panel 905. Also, notification may be made by a method such as causing the housing of the device itself to vibrate.

Also, indication of an status in which operation is not possible may be made to the user by mechanically locking an operation unit such as the shutter button 902 or the operation button 904 in a case where the camera is in a state in which capturing cannot be performed due to the time interval restriction in the above described third embodiment or the like.

By the fourth embodiment, as explained above, it is possible to appropriately report to a user on the client device side in a case where added-image conditions of the client device were changed by the server device.

<Fifth Embodiment>

Below, a fifth embodiment according to the present invention will be explained. In the fifth embodiment the configurations of the server device and the client device are similar to those in the first embodiment and so their explanation is omitted. According to the fifth embodiment, after the server device executes load adjustment according to the processing sequence shown in FIG. 5 in the same way as in the above described first embodiment, load adjustment is performed once again by further changing added-image conditions of the client device.

Figure 10:
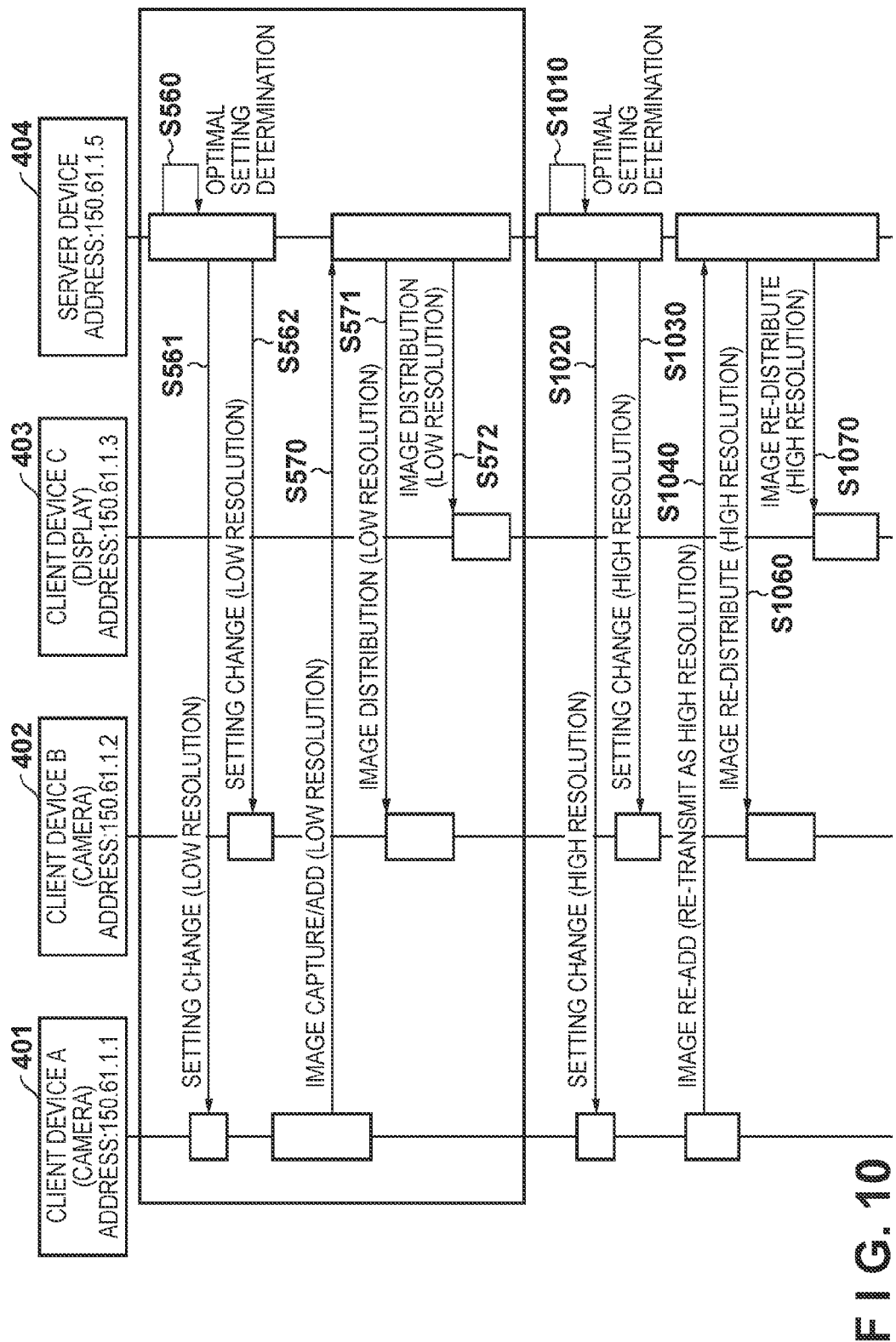
FIG. 10 is a view for showing an example of a processing sequence between the server device and the client device in a fifth embodiment.

In FIG. 10 an example of a processing sequence for load adjustment in a fifth embodiment is shown. In FIG. 10, each of the client devices and the server device are similar to those shown in FIG. 4, and furthermore the sequences of step S560, step S561, step S562, step S570, step S571 and step S572 are the same as the sequences shown in FIG. 5. After load adjustment is executed in the same sequence as in FIG. 5 (steps S560 through S572), the sequence from step S1010 is executed to further change the added-image conditions of the client in the fifth embodiment as shown in FIG. 10. In other words, FIG. 10 is showing that processing of steps S1020 through S1070 is performed in a case where a different adjustment result is obtained in a second load adjustment (step S1010) to the previous time (step S560).

It is assumed that in FIG. 10, in step S560, a determination is made to change the added-image conditions of each client to a low resolution setting. However, a case is shown in which after this, along with a status change such as a rise or fall in the number of clients participating in the stream, it was determined in step S1010 that the added-image conditions of each of the clients be changed to a high resolution setting. Specifically, in this case, the values of the calculated predicted load and the target load are different in step S560 and step S1010, and the comparison result in step S850 is reversed. In other words, in step S1010, the predicted load is less than the target load by a large amount.

In this case, in step S1020, as in step S561, a request is made to the client A to change the added-image conditions. The change content here is different on the point that whereas in step S561 there was a resolution reduction, in step S1020 a resolution increase is requested. Also, in step S1030, as in step S562, a request is made to the client B for an added-image conditions change, but whereas a resolution reduction was requested in step S562, a resolution increase is requested in step S1030. Note, in a case where a request is made for a resolution increase to the client devices by the server device in this way, the clients are selected in an order from the one that will contribute the least to a server load increase in step S860 in the flowchart shown in FIG. 8. With this, it is possible to distribute high resolution images to more client devices.

The client device A 401 that receives the added-image conditions change request in step S1020, in order that image data added (transmitted) to the stream at a low resolution setting in step S570 in the load adjustment of the previous time be added to the stream at a high resolution this time, makes another request to the server device in step S1040.

At this time, the client devices B 402 and C 403 each received, in steps S571 and S572 respectively, distribution of the image that the client device A 401 captured and added to the stream in step S570, but in the fifth embodiment, distribution in accordance with the retransmission in step S1040 is further performed. In other words, the client devices B 402 and C 403 can receive the re-distribution of higher resolution images in steps S1060 and S1070 respectively.

With the fifth embodiment as explained above, it is possible to once again distribute at a high resolution an image that was previously transmitted at a low resolution in a case where the high resolution image became distributable due to a status change.

Note, in the fifth embodiment an example is shown in which after initially performing resolution reduction setting of the data on the client device, resolution increase setting is performed if the server load status improves. However, the client setting change is not limited to this temporal order. For example, configuration may be taken so that the processing shown in FIG. 8 from step S860 is performed if, in step S850, the predicted load is larger than the target load, and client device resolution increase setting is performed in a case where the predicted load is less than the target load by a predetermined threshold.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183593, filed Aug. 22, 2012, which is hereby incorporated by reference herein in its entirety.

What is claimed is:

1. An information processing apparatus which is connected to a plurality of information processing terminals via a network, comprising:
    an acquisition unit configured to acquire data that is repeatedly generated at and uploaded from at least one of the plurality of information processing terminals;
    a detection unit configured to detect connection status information of the plurality of information processing terminals and a generation condition for data in the information processing terminals, wherein the generation condition indicates a parameter used in generating data to be uploaded to the information processing apparatus by the information processing terminal;
    a derivation unit configured to derive a predicted data amount predicted to be uploaded in a unit time to the information processing apparatus and a processable data amount that the information processing apparatus is capable of processing in a unit time based on at least one of the connection status information or the generation condition; and
    a request unit configured to make a request to at least one information processing terminal, in a case where the predicted data amount exceeds the processable data amount, to change the generation condition for data in the at least one information processing terminal in order to lower a data amount.

2. The information processing apparatus according to claim 1 wherein the request unit is further configured to instruct the at least one information processing terminal to use the changed generation condition in order to reduce a data amount that the at least one information processing terminal uploads.

3. The information processing apparatus according to claim 1 wherein the request unit is further configured to select an information processing terminal to which to make a request to change the generation condition, out of the plurality of information processing terminals, and to make a request to the selected information processing terminal to change the generation condition.

4. The information processing apparatus according to claim 1 wherein the request unit is further configured to select information processing terminals, out of the plurality of information processing terminals, in order of a data amount that the information processing terminals upload in a unit time from the largest, and to make a request to the selected information processing terminals to change the generation condition.

5. The information processing apparatus according to claim 1 further comprising a receiving unit configured to receive a request for a downloading of data from at least one of the plurality of information processing apparatuses.

6. The information processing apparatus according to claim 1 further comprising a retention unit configured to retain the uploaded data.

7. The information processing apparatus according to claim 1 wherein the connection status information indicates at least one of a number of the information processing terminals that upload data or a frequency in which the data is uploaded to the information processing apparatus.

8. The information processing apparatus according to claim 1 wherein the data is image data and the generation condition indicates a size and/or a resolution of the image data to be uploaded.

9. The information processing apparatus according to claim 1 wherein, the request unit is further configured to, in a case where the predicted data amount is less than the processable data amount, change the generation condition of at least one information processing terminal in order to increase a data amount to the processable data amount.

10. The information processing apparatus according to claim 1 further comprising a collection unit configured to collect from each of the information processing terminals the generation condition that the image processing terminal uses.

11. The information processing apparatus according to claim 1 wherein one of the information processing terminals is a camera and the acquisition unit is further configured to acquire captured images from the camera in real time and the camera captures the images in accordance with the generation condition.

12. A data distribution system having a plurality of information processing terminals and an information processing apparatus which is connected to the plurality of information processing terminals via a network,
    the information processing apparatus comprising:

an acquisition unit configured to acquire data that is repeatedly generated at and uploaded from at least one of the plurality of information processing terminals;

a detection unit configured to detect connection status information of the plurality of information processing terminals and a generation condition for data in the information processing terminals, wherein the generation condition indicates a parameter used in generating data to be uploaded to the information processing apparatus by the information processing terminal;

a derivation unit configure to derive a predicted data amount predicted to be uploaded in a unit time to the information processing apparatus and a processable data amount that the information processing apparatus is capable of processing in a unit time based on at least one of the connection status information or the generation condition; and a request unit configured to make a request to at least one information processing terminal, in a case where the predicted data amount exceeds the processable data amount, to change the generation condition for data in the at least one information processing terminal in order to lower a data amount.

13. A method of controlling an information processing apparatus which is connected to a plurality of information processing terminals via a network, the method comprising:

acquiring data that is repeatedly generated at and uploaded from at least one of the plurality of information processing terminals;

detecting connection status information of the plurality of information processing terminals and a generation condition for data in the information processing terminals, wherein the generation condition indicates a parameter used in generating data to be uploaded to the information processing apparatus by the information processing terminal;

deriving a predicted data amount predicted to be uploaded in a unit time to the information processing apparatus and a processable data amount that the information processing apparatus is capable of processing in a unit time based on at least one of the connection status information or the generation condition; and making a request to at least one information processing terminal, in a case where the predicted data amount exceeds the processable data amount, to change the generation condition for data in the at least one information processing terminal in order to lower a data amount.

14. A non-transitory computer-readable storage medium storing a program for causing a computer which is connected to a plurality of information processing terminals via a network to:

acquire data that is repeatedly generated at and uploaded from at least one of the plurality of information processing terminals;

detect connection status information of the plurality of information processing terminals and a generation condition for data in the information processing terminals, wherein the generation condition indicates a parameter used in generating data to be uploaded to the information processing apparatus by the information processing terminal;

derive a predicted data amount predicted to be uploaded in a unit time to the information processing apparatus and a processable data amount that the information processing apparatus is capable of processing in a unit time based on at least one of the connection status information or the generation condition; and make a request to at least one information processing terminal, in a case where the predicted data amount exceeds the processable data amount, to change the generation condition for data in the at least one information processing terminal in order to lower a data amount.

15. The information processing apparatus according to claim 1, wherein:

the detection unit is further configured to detect frequency information indicating frequency of data uploaded from the information processing terminal to the information processing apparatus; and the derivation unit is further configured to derive the predicted data amount predicted to be uploaded in a unit time to the information processing apparatus based on the frequency information.

16. The information processing apparatus according to claim 1, wherein the detection unit is further configured to detect information of an event held at a predetermined time, and the derivation unit is further configured to derive the predicted data amount based on the information of the event.

17. The image processing apparatus according to claim 1, wherein at least one of the plurality of information processing terminals is a camera, wherein the request unit is further configured to request the camera to capture an image using image capturing settings in accordance with the generation condition.

18. The image processing apparatus according to claim 1, wherein at least one of the plurality of information processing terminals is a camera, wherein the request unit is further configured to control the camera to disable an image capturing function while an image capturing interval is less than an interval in accordance with the generation condition.

19. The image processing apparatus according to claim 1, wherein the request unit is further configured to control the at least one information processing terminal to notify a user of the at least one information processing terminal of change of the generation condition by means of at least one of a visual output, an audible output, or vibration.

20. The image processing apparatus according to claim 1, wherein the derivation unit is further configured to derive a predicted data amount predicted to be uploaded in a unit time to the information processing apparatus and a processable data amount that the information processing apparatus is capable of processing in a unit time based on the generation condition.

* * * * *